United States Patent
Zhang et al.

(10) Patent No.: US 12,233,795 B2
(45) Date of Patent: Feb. 25, 2025

(54) VEHICLE-ELECTRIC VEHICLE SUPPLY EQUIPMENT CONNECTION CONFIRMATION

(71) Applicant: Ford Global Technologies, LLC, Dearborn, MI (US)

(72) Inventors: Yuan Zhang, Canton, MI (US); Timothy Harris, Grosse Ile, MI (US); Toussaint Carpenter, Westland, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 336 days.

(21) Appl. No.: 17/393,193

(22) Filed: Aug. 3, 2021

(65) Prior Publication Data

US 2023/0040428 A1  Feb. 9, 2023

(51) Int. Cl.
  *B60L 53/16*  (2019.01)
  *B60L 53/30*  (2019.01)
  *B60R 16/033*  (2006.01)
  *H02J 7/00*  (2006.01)

(52) U.S. Cl.
  CPC ............ *B60R 16/033* (2013.01); *B60L 53/16* (2019.02); *B60L 53/305* (2019.02); *H02J 7/0031* (2013.01); *H02J 2310/48* (2020.01)

(58) Field of Classification Search
  CPC ...... B60L 53/305; B60L 53/16; B60R 16/033; H02J 7/0031; H02J 2310/48

USPC .......................................................... 307/10.1
  See application file for complete search history.

(56) References Cited

U.S. PATENT DOCUMENTS

| | | | |
|---|---|---|---|
| 9,784,229 B2 | 10/2017 | Holub et al. | |
| 2010/0161481 A1 | 6/2010 | Littrell | |
| 2013/0300429 A1* | 11/2013 | Jefferies | B60L 53/31 324/511 |
| 2021/0170898 A1* | 6/2021 | Ando | E05B 81/56 |
| 2021/0245610 A1* | 8/2021 | Ando | B60L 55/00 |
| 2022/0185137 A1* | 6/2022 | Cesiel | H02J 7/00045 |

FOREIGN PATENT DOCUMENTS

| | | |
|---|---|---|
| KR | 100733196 B1 | 6/2007 |
| WO | 2012149230 A2 | 11/2012 |

* cited by examiner

*Primary Examiner* — Hal Kaplan
*Assistant Examiner* — Swarna N Chowdhuri
(74) *Attorney, Agent, or Firm* — David B. Kelley; Brooks Kushman P.C.

(57) ABSTRACT

A vehicle includes control pilot circuitry connected with a charge port and including a control pilot line, a resistor, and a switch that selectively connects the resistor between the control pilot line and a ground of electric vehicle supply equipment plugged into the charge port. The vehicle also includes a controller that toggles the switch between open and closed states after receiving an off-board request defining a number of toggles for the switch.

11 Claims, 5 Drawing Sheets

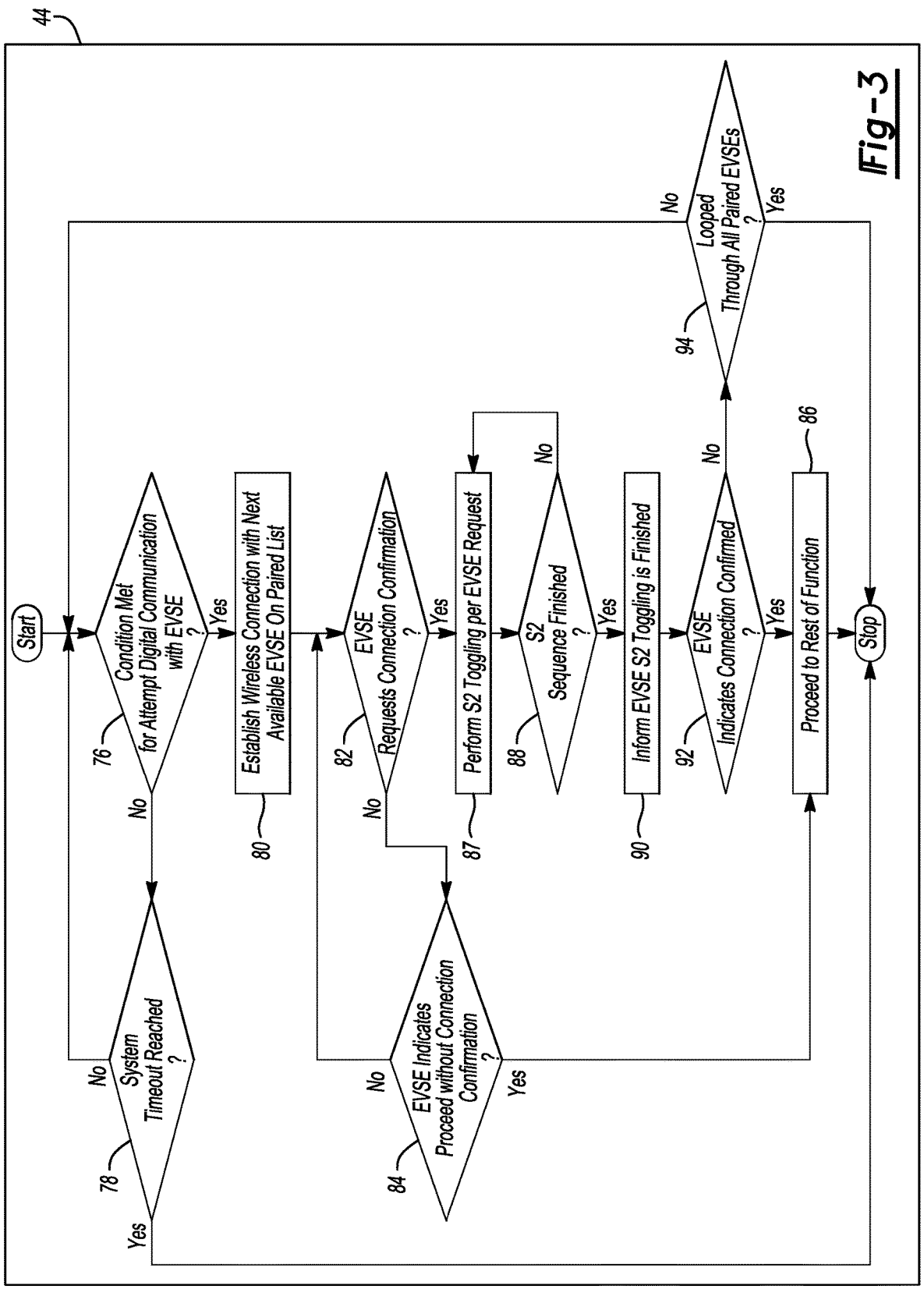

VEHICLE-ELECTRIC VEHICLE SUPPLY EQUIPMENT CONNECTION CONFIRMATION

TECHNICAL FIELD

This disclosure relates to the charging of automotive batteries.

BACKGROUND

SAE Surface Vehicle Recommended Practice J1772, SAE Electric Vehicle Conductive Charge Coupler (SAE J1772) is a North American standard for electric vehicle electrical connectors maintained by SAE International. It concerns communication protocol, electrical, performance, and physical requirements for electric vehicle conductive charge systems and associated couplers. This standard intends to define a common electric vehicle conductive charging system architecture, including dimensional, functional, and operational requirements, for vehicle inlets and mating connectors.

IEC 61851 is an international standard for electric vehicle conductive charging systems.

SUMMARY

A vehicle includes a charge port that receives a plug of electric vehicle supply equipment, control pilot circuitry connected with the charge port and including a control pilot line, a resistor, and a switch that selectively connects the resistor between the control pilot line and a ground of the electric vehicle supply equipment, and a controller that toggles the switch between open and closed states after receiving an off-board request defining a number of toggles for the switch.

A method includes, responsive to receiving an off-board request defining a number of toggles for a switch of control pilot circuitry of a vehicle configured to selectively connect a resistor of the control pilot circuitry between a control pilot line of the control pilot circuitry and a ground of electric vehicle supply equipment connected with the control pilot circuitry, toggling the switch between open and closed states according to the number.

A vehicle interface includes a controller that toggles a switch that electrically connects a resistor between a control pilot line and a ground of electric vehicle supply equipment after receiving an off-board request to toggle the switch between open and closed positions a predetermined number of times.

BRIEF DESCRIPTION OF THE DRAWINGS

FIG. 3 is a flow chart of an algorithm for communicating with electric vehicle supply equipment.

DETAILED DESCRIPTION

Figure 1:
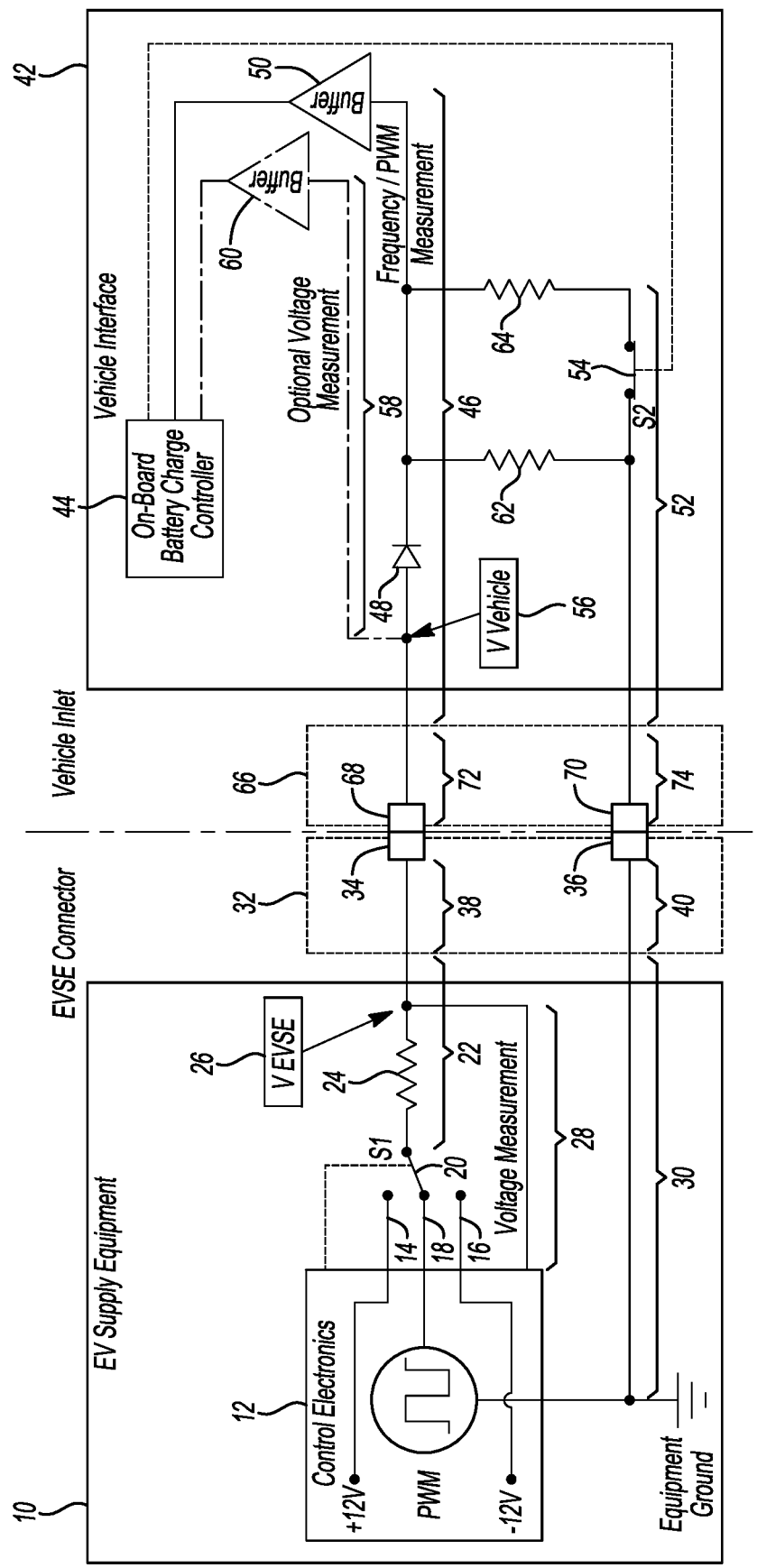
FIG. 1 is a schematic diagram of electric vehicle supply equipment and a vehicle interface.

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Electric vehicles and plug-in hybrid electric vehicles may receive charge via electric vehicle supply equipment that physically connects an off-board charge station to the vehicle via wires. This electric vehicle supply equipment may also physically connect other off-board equipment to the vehicle to permit the vehicle to supply high voltage energy to the other off-board equipment via the wires. Communication between the electric vehicle supply equipment and vehicle, however, may be facilitated via typical wireless—instead of wired—channels. Such communication may be triggered when the electric vehicle supply equipment is plugged into the vehicle. That is, energy transfer and communication may involve different means (wireless vs. wired).

An electric vehicle may thus have previously paired with multiple electric vehicle supply equipment in, for example, a parking lot outfitted with several electric vehicle supply equipment stations. Responsive to one of them being plugged into the electric vehicle, the electric vehicle may attempt to wirelessly connect to the last electric vehicle supply equipment that it was paired to—not the electric vehicle supply equipment that is plugged into it: The electric vehicle may end up communicating with the wrong electric vehicle supply equipment.

Here, we consider strategies in which the electric vehicle supply equipment plugged into a vehicle requests the vehicle to perform some action that can be measured by the electric vehicle supply equipment. The electric vehicle supply equipment can then confirm whether the measurement agrees with the request. If so, the electric vehicle supply equipment can confirm that the vehicle is communicating with the correct electric vehicle supply equipment. Energy transfer via the electric vehicle supply equipment can then be permitted to take place.

Charging system interface circuitry typically needs to follow charge related standards, such as SAE J1772 and IEC 61851. Based on these standards, the vehicle has control over a certain switch in the control pilot circuit. With this switch open/closed, the electric vehicle supply equipment can measure a voltage change on the control pilot line. By having the electric vehicle supply equipment request the vehicle to perform a certain switch open/close sequence, the electric vehicle supply equipment can determine if the measured response matches that requested. The sequence could be any pattern provided the electric vehicle supply equipment and vehicle agree to the same.

In one example, the electric vehicle supply equipment requests, via the wireless communication channel established between them, the vehicle to perform a certain number of switch toggles. Each toggle may be defined as the switch being closed for a predefined time period followed by the switch being open for another predefined time period. The vehicle informs the electric vehicle supply equipment, via the wireless communication channel, when the sequence is finished. The electric vehicle supply equipment then compares the number of switch toggles it has counted to the number it has requested. If the two match, the electric vehicle supply equipment can confirm the vehicle and it are both physically and wirelessly connected, and inform the vehicle of the same. Otherwise, the connected confirmation is not successful (connection not confirmed), and the vehicle moves on to establish wireless communication with the next electric vehicle supply equipment that is on its paired list and is in proximity thereto.

Referring to FIG. 1, electric vehicle supply equipment 10 has control electronics 12, a +12V output 14, a −12V output 16, a pulse width modulation (PWM) output 18, a switch 20, a control pilot portion 22, which includes resistor 24, a voltage sensor 26, a voltage sensor line 28, and a ground portion 30, which is grounded. The outputs 12, 14 are connected with +12V and −12V sources, respectively. The PWM output 18 is connected with an oscillator that, in this example, is a 1 KHz oscillator between +/−12V, which is grounded. The switch 20 is electrically connected in series between the control electronics 12 and resistor 24. Depending on the mode in which the electric vehicle supply equipment 10 is operating when plugged in, the switch 20 will either be connected to the +12V output 14 or the PWM output 18. The voltage sensor line 28 electrically connects the control electronics 12 and voltage sensor 26, which is arranged to sense the voltage on the control pilot portion 22 (after the switch 20 and resistor 24) and carry the same to the control electronics 12.

An electric vehicle supply equipment connector 32 includes terminals 34, 36, a control pilot portion 38, and a ground portion 40. The control pilot portion 38 is electrically connected between the control pilot portion 22 and terminal 34. The ground portion 40 is electrically connected between the ground portion 30 and terminal 36.

A vehicle interface 42 includes an on-board charge controller 44, a control pilot portion 46 including diode 48 and buffer 50, a ground portion 52 including switch 54, a voltage sensor 56, a voltage sensor line 58 including buffer 60, and grounding resistors 62, 64. The switch 54 is controlled by the on-board charge controller 44. The voltage sensor line 58 electrically connects the on-board battery charge controller 44 and voltage sensor 56, which is arranged to sense the voltage on the control pilot portion 46 (prior to the diode 48 and buffer 50) and carry the same to the on-board battery charge controller 44. The grounding resistors 62, 64 electrically connect the control pilot portion 46 to the ground portion 52 on either side of the switch 54.

A vehicle charge port 66 includes terminals 68, 70, a control pilot portion 72, and a ground portion 74. The control pilot portion 72 is electrically connected between the control pilot portion 46 and terminal 68. The ground portion 74 is electrically connected between the ground portion 52 and terminal 70.

When the electric vehicle supply equipment connector 32 and vehicle charge port 66 are connected (that is, when the electric vehicle supply equipment 10 is plugged in), the terminals 34, 68 mate, resulting in control pilot portions 22, 38, 46, 72 forming a continuous control pilot line between the control electronics 12 and on-board battery charge controller 44 that carries signals therebetween for measurement and interpretation by the on-board battery charge controller 44. The terminals 36, 70 also mate, resulting in ground portions 30, 40, 52, 74 forming a continuous ground line between the control pilot portion 46 and ground of the electric vehicle supply equipment 10.

Figure 2A:
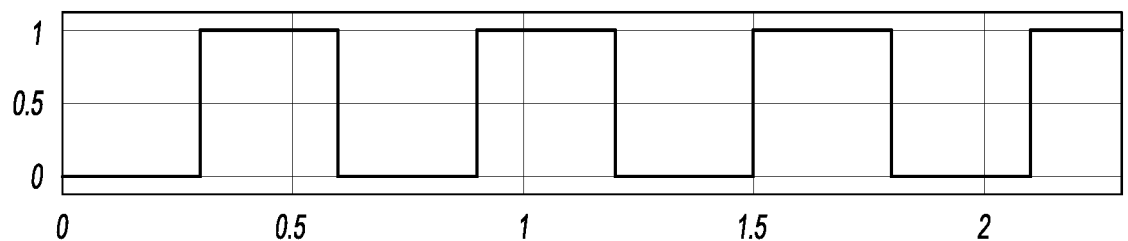
FIG. 2A is plot of a square wave generated by the control electronics of FIG. 1.
Figure 2B:
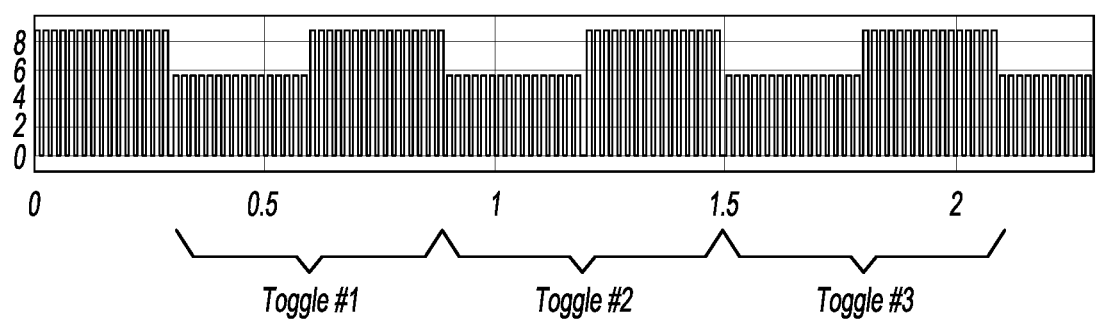
FIG. 2B is a plot of voltage associated with the square wave of FIG. 2B.

Referring to FIGS. 1, 2A and 2B, when the switch 54 is open (assuming the switch 20 is connected to the PWM output 18), the voltage sensors 26, 56 measure the peak-to-peak voltage of the PWM wave as, in this example, 9V. When the switch 54 is closed, the voltage sensors 26, 56 measure the peak-to-peak voltage of the PWM wave as, in this example, 6V. That is, the peak-to-peak voltage depends on whether the switch is open or closed. By monitoring the voltage sensor 26, the control electronics 12 can identify when the switch 54 is open and closed, and count the switch toggles accordingly.

Referring to FIG. 3, the on-board charge controller 44 at operation 76 determines whether conditions are met for attempting to wirelessly communicate with the electric vehicle supply equipment 10. Such conditions may include the on-board charge controller 44 detecting in conventional fashion whether the electric vehicle supply equipment 10 is plugged in. If no, the on-board charge controller 44 determines via a timer at operation 78 whether system timeout has been reached. If no, the algorithm returns to operation 76. If yes, the algorithm ends.

Returning to operation 76, if yes, the on-board charge controller 44 establishes a wireless connection (e.g., WiFi, BLUETOOTH, etc.) with the next available electric vehicle supply equipment on its previously paired list at operation 80 via conventional technology. At operation 82, the on-board vehicle charge controller 44 determines whether the next available electric vehicle supply equipment has requested connection confirmation. If no, the on-board vehicle charge controller 44 at operation 84 determines whether the next available electric vehicle supply equipment has indicated to proceed without connection confirmation. If no, the algorithm returns to operation 82. If yes, the on-board charge controller 44 at operation 86 permits energy transfer via the vehicle charge port 66 and electric vehicle supply equipment 10. If for example, an off-board load connected with the electric vehicle supply equipment 10 requests energy from a traction battery associated with the vehicle interface 42, the on-board charge controller 44 may permit such energy to flow from the traction battery via a separate wired connection between the traction battery and electric vehicle supply equipment 10 to satisfy the request. The algorithm then ends.

Returning to operation 82, if yes, the on-board charge controller 44 at operation 87 performs toggling of the switch 54 as requested by the next available electric vehicle supply equipment. The on-board charge controller 44 at operation 88 then determines whether the requested toggling sequence is completed. If no, the algorithm returns to operation 87. If yes, at operation 90, the on-board charge controller 44 informs the next available electric vehicle supply equipment that the toggling is finished. At operation 92, the on-board charge controller 44 determines whether the next available electric vehicle supply equipment has indicated that the connection is confirmed. If yes, the on-board charge controller 44 proceeds to operation 86 as the next available electric vehicle supply equipment with which the on-board charge controller 44 has been communicating is indeed the electric vehicle supply equipment 10.

If no, the on-board charge controller 44 at operation 94 determines whether it has looped through all previously paired electric vehicle supply equipment. If no, the algorithm returns to operation 76. If yes, the algorithm then ends.

Figure 4:
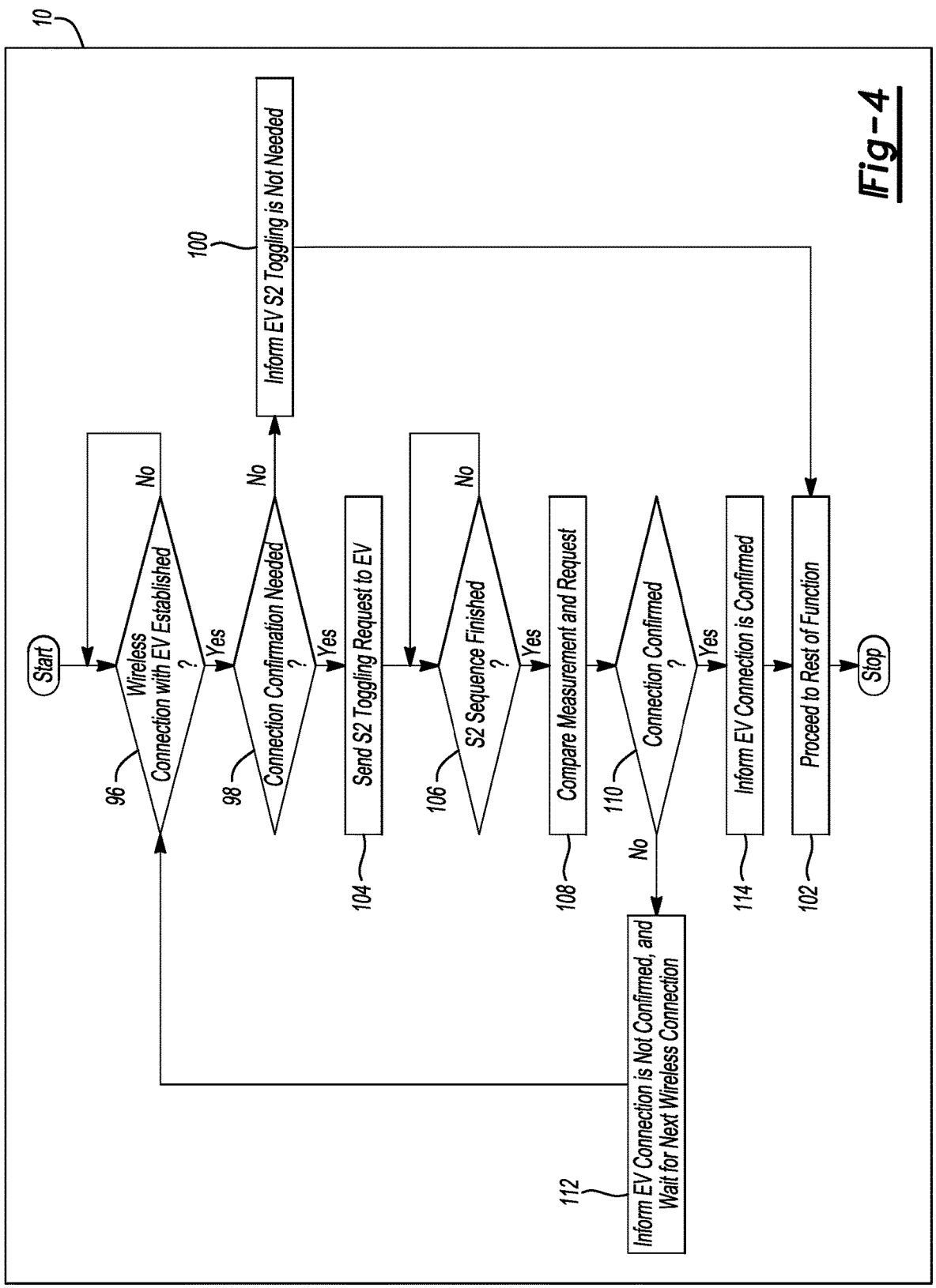
FIG. 4 is a flow chart of an algorithm for communicating with a vehicle.

Referring to FIG. 4, the electric vehicle supply equipment 10 at operation 96 determines whether a wireless connection with a vehicle interface has been established via conventional techniques (e.g., challenge/response, etc.). If no, the algorithm returns to operation 96. If yes, at operation 98, the electric vehicle supply equipment 10 determines whether a connection confirmation is needed. If no, the electric vehicle supply equipment 10 at operation 100 then informs the vehicle interface 42 that switch toggling is not needed. At operation 102, the electric vehicle supply equipment 10 may permit energy transfer. The algorithm then ends.

Returning to operation 98, if yes, the electric vehicle supply equipment 10 at operation 104 sends a switch toggling request to the vehicle interface with which it is communicating defining a certain number of switch toggles. At operation 106, the electric vehicle supply equipment 10 determines whether the vehicle interface with which it is communicating has indicated whether the switching sequence is finished. If no, the algorithm returns to operation 106. If yes, the electric vehicle supply equipment 10 compares the measured number of switch toggles with the requested number of switch toggles at operation 108.

At operation 110, the electric vehicle supply equipment 10 determines whether the connection is confirmed. If no (the measured number of switch toggles does not match the requested number of switch toggles), the electric vehicle supply equipment 10 at operation 112 informs the vehicle interface with which it is communicating that the connection is not confirmed. The algorithm then returns to operation 96. If yes (the measured number of switch toggles does match the requested number of switch toggles), the electric vehicle supply equipment 10 at operation 114 informs the vehicle interface with which it is communicating that the connection is confirmed. That is, the vehicle interface with which it is communicating is the vehicle interface 42. The algorithm then proceeds to operation 102.

Figure 5:
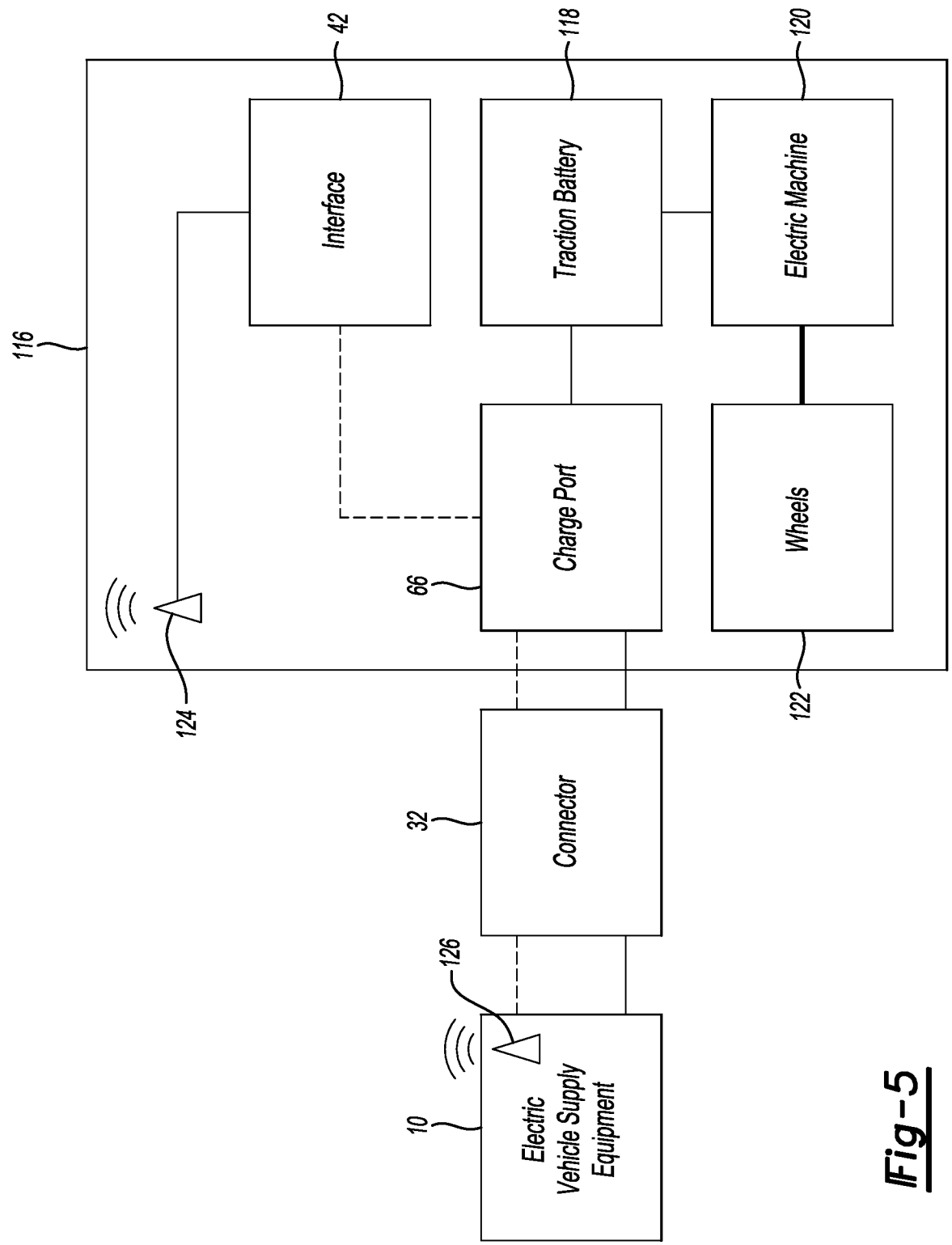
FIG. 5 is a block diagram of a vehicle and electric vehicle supply equipment.

Referring to FIG. 5, a vehicle 116 includes the vehicle interface 42, the vehicle charge port 66, a traction battery 118, an electric machine 120, wheels 122, and a wireless transceiver 124. The traction battery 118 is arranged to provide electrical power to, and receive electrical power from, the electric machine 120. The electric machine 120 transforms electrical power from the traction battery 118 to mechanical power to move the wheels 122. The electric machine 120 also transforms mechanical power from the wheels 122, during regenerative braking, to electrical power for storage in the electric machine 120. The traction battery 118 is also arranged to receive electrical power from the charge port 66 and provide power to the electrical charge port 66.

The vehicle interface 42 can transmit and receive wireless messages, etc., via the transceiver 124.

The electric vehicle supply equipment 10 includes a transceiver 126. The electric vehicle supply equipment 10 can transmit and receive wireless messages, etc., via the transceiver 126.

The dashed line connecting the electric vehicle supply equipment 10, the connector 32, the vehicle charge port 66, and the vehicle interface 42 represents the control pilot line between the electric vehicle supply equipment 10 and the vehicle interface 42. The solid line connecting the electric vehicle supply equipment 10, the connector 32, the charge port 66, and the traction battery 118 represents the wired path over which electric power can be transferred between the electric vehicle supply equipment 10 and the traction battery 118.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of the disclosure.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A method comprising:
responsive to receiving an off-board request defining a number of consecutive toggles for a switch of control pilot circuitry of a vehicle configured to selectively connect a resistor of the control pilot circuitry between a control pilot line of the control pilot circuitry and a ground of electric vehicle supply equipment connected with the control pilot circuity, consecutively toggling the switch between open and closed states according to the number.

2. The method of claim 1 further comprising transmitting an off-board message indicating that toggling of the switch is complete.

3. The method of claim 2 further comprising establishing wireless communications with other electric vehicle supply equipment after receiving an off-board message indicating that a connection between the electric vehicle supply equipment and vehicle is not confirmed.

4. The method of claim 2 further comprising permitting power transfer via the charge port and electric vehicle supply equipment after receiving a message from the electric vehicle supply equipment indicating that a connection with the electric vehicle supply equipment is confirmed.

5. The method of claim 1, wherein a voltage of the control pilot line depends on whether the switch is open or closed.

6. A vehicle interface comprising:
   a controller programmed to consecutively toggle a switch that electrically connects a resistor between a control pilot line and a ground of electric vehicle supply equipment between open and closed positions after receiving an off-board request to consecutively toggle the switch between the open and closed positions a predetermined number of times.

7. The vehicle interface of claim 6, wherein the controller is further programmed to transmit a message off-board the vehicle indicating that toggling of the switch is complete.

8. The vehicle interface of claim 7, wherein the controller is further programmed to establish wireless communications with other electric vehicle supply equipment after receiving an off-board message indicating that a connection with the electric vehicle supply equipment is not confirmed.

9. The vehicle interface of claim 7, wherein the controller is further programmed to permit power transfer via the electric vehicle supply equipment after receiving a message from the electric vehicle supply equipment indicating that a connection with the electric vehicle supply equipment is confirmed.

10. The vehicle interface of claim 6, wherein a voltage of the control pilot line depends on whether the switch is open or closed.

11. The vehicle of claim 6, wherein the controller is an on-board battery charge controller.

\* \* \* \* \*